Aug. 19, 1958  R. G. OLSON ET AL  2,847,879
POWER OPERATOR FOR MACHINE TOOLS
Filed July 14, 1955  4 Sheets-Sheet 1

INVENTORS.
Raymond G. Olson
Howard W. Ronfeldt
By Kenneth P. Snow
Atty

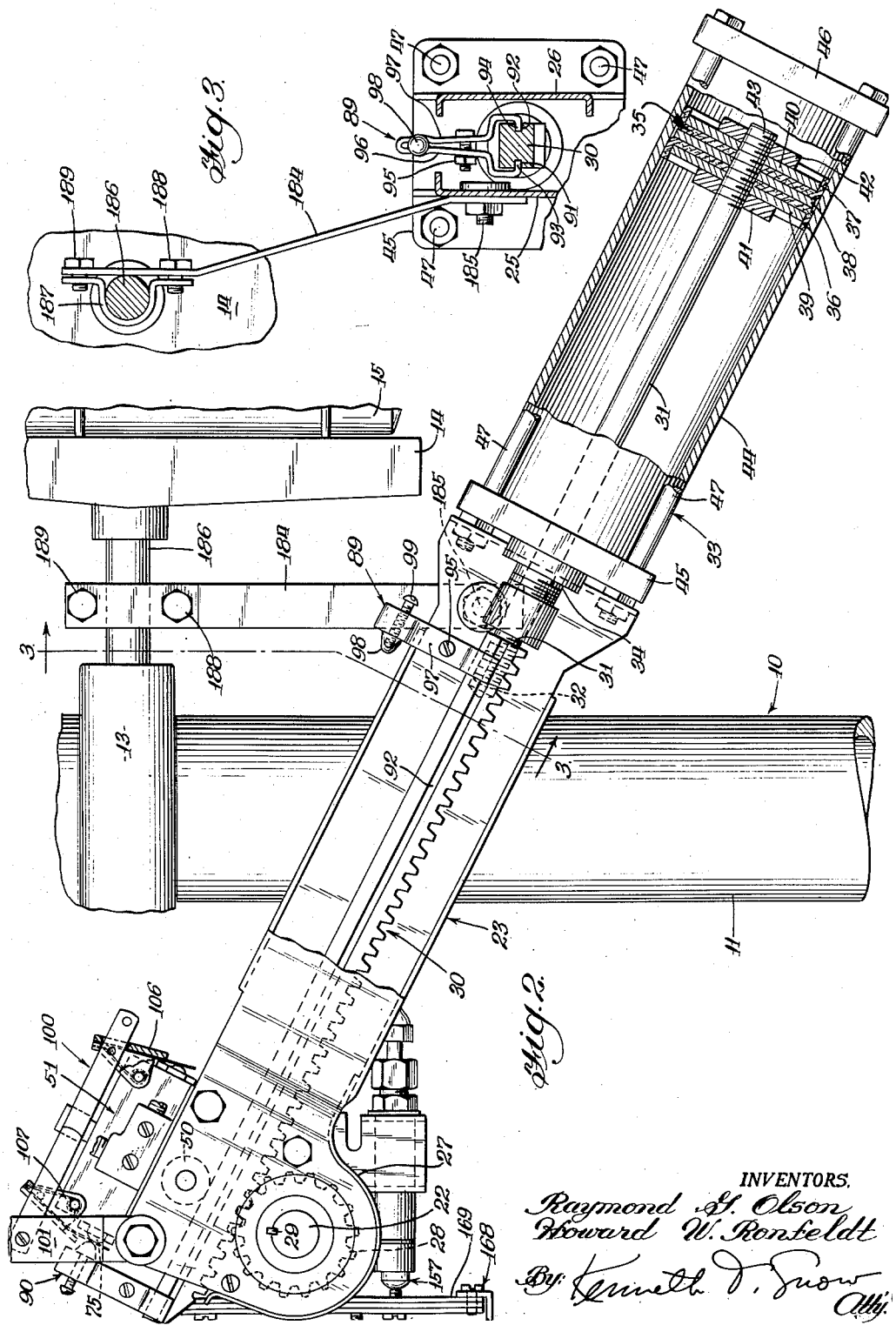

Aug. 19, 1958  R. G. OLSON ET AL  2,847,879
POWER OPERATOR FOR MACHINE TOOLS
Filed July 14, 1955  4 Sheets-Sheet 3
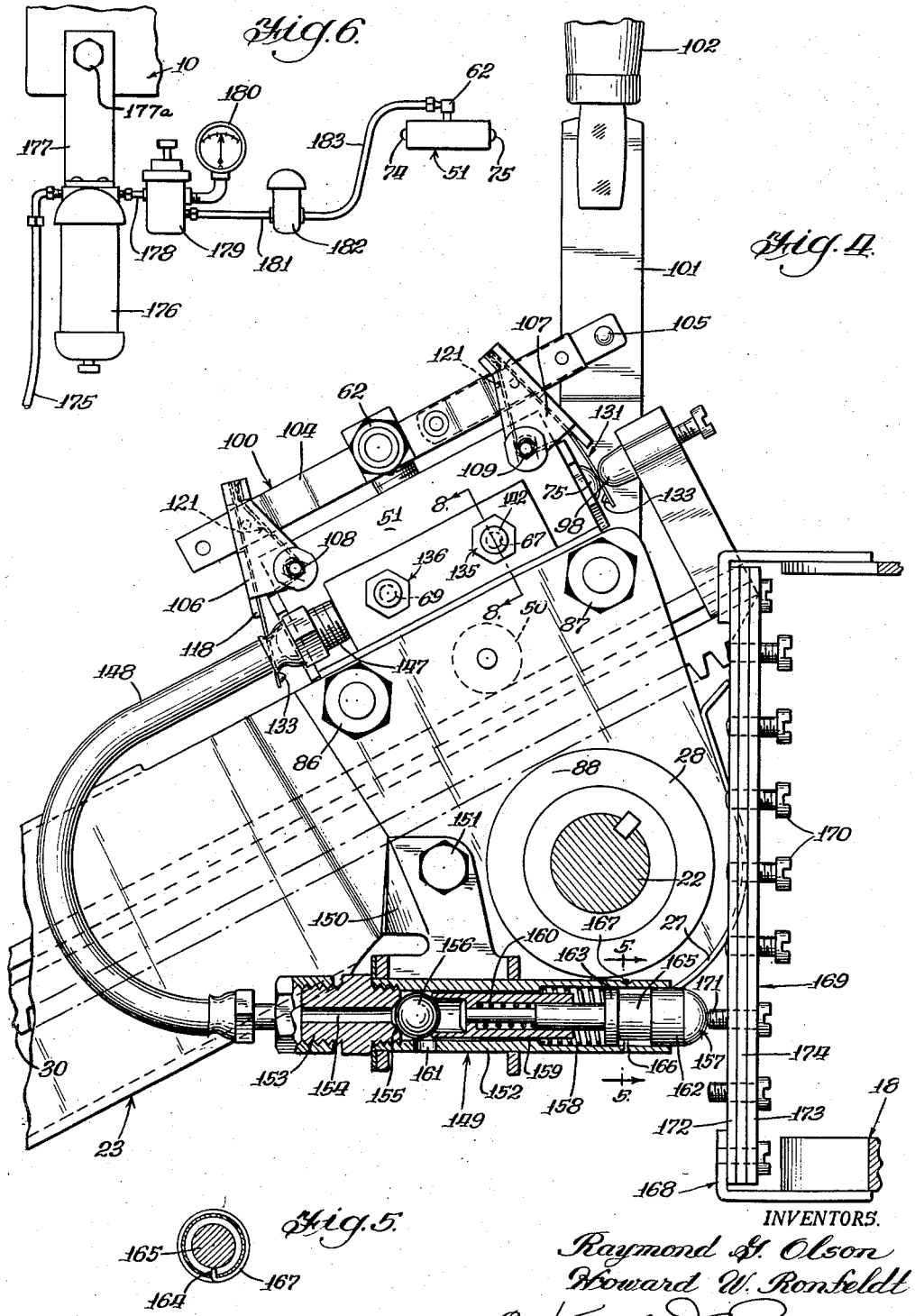
INVENTORS.
Raymond G. Olson
Howard W. Ronfeldt
By: Kenneth J. Snow Atty.

Aug. 19, 1958  R. G. OLSON ET AL  2,847,879
POWER OPERATOR FOR MACHINE TOOLS
Filed July 14, 1955  4 Sheets-Sheet 4
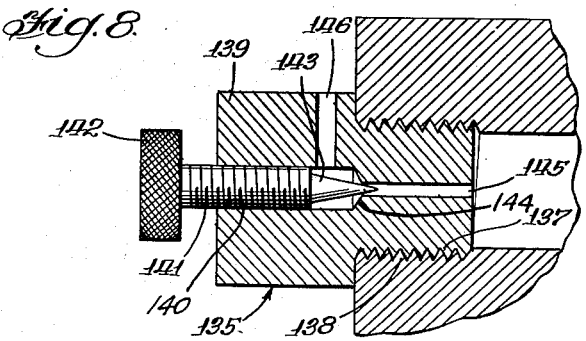
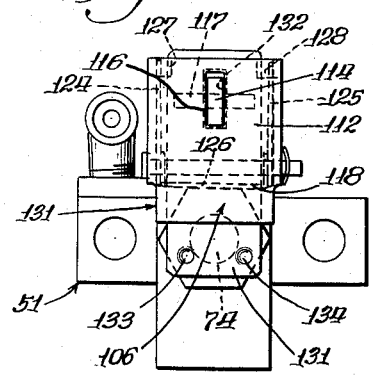
INVENTORS.
Raymond G. Olson
Howard W. Ronfeldt
By Kenneth T. Snow Atty.

United States Patent Office 2,847,879
Patented Aug. 19, 1958

2,847,879

POWER OPERATOR FOR MACHINE TOOLS

Raymond G. Olson, Niles, Ill., and Howard W. Ronfeldt, Toledo, Ohio, assignors, by mesne assignments, to Cleveland Pneumatic Industries, Inc., Cleveland, Ohio, a corporation of Ohio Application July 14, 1955, Serial No. 522,028

11 Claims. (Cl. 77—33.7)

This invention relates to a new and improved power operator for machine tools.

The operation of machine tools and including drill presses has for many years been accomplished only by manual operation. In drill presses the operator moves the press spindle by a hand lever. In this manner the operator "feels" the work he is doing back into the hand lever and exerts greater or lesser forces as the need arises. Others have attempted to harness various forms of power to operate machine tools such as drill presses, but there has been an utter lack of obtaining a power operator which could simulate the very desirable "feel" operation of the manually operated machines.

It is therefore a principal object of the present invention to provide a power feed device for machine tools and including drill presses which can be arranged and constructed to substantially simulate hand operation of such machines.

An important object of this invention is the provision of an air feed attachment for drill presses which simultaneously permits power operation or hand operation of the drill press as desired.

Another important object of this invention is to equip an air feed for drill presses with means for mounting the air feed directly onto the "pinion" shaft which normally receives the usual hand operating lever to thereupon eliminate costly conversions.

Another and further important object and advantage of this invention is to supply a feed mechanism for drill presses wherein the device may be arranged and constructed to automatically cycle the entire operation of the drill press with the employment of a control valve such as shown in the copending application of Raymond G. Olson, now Patent No. 2,729,242.

Still another important object of this invention is to provide an auxiliary gear rack in association with the power feed of this invention and wherein the auxiliary gear rack may be extended or withdrawn by a fluid cylinder and the gear rack has stops adjustable therealong adjacent each end thereof whereby an intermediately disposed control valve may cause automatic reciprocation of the auxiliary gear rack and thus also operation of the movable part of a machine tool or the like.

A further important object of this invention is to supply a power operator for machine tools employing a control valve of the type having actuating members in opposite ends thereof such as shown in copending application, now Patent No. 2,729,242, and the power operator having adjustable stops for automatic operation of the control valve with a superimposed manual operator wherein the manually operating mechanism may be actuated at any time to countermand the automatic operation or to operate the device manually with power feed.

Another important object of this invention is to equip the control valve used in this air feed for drill presses or the like with a rockable harness device with spaced apart spring actuating members for disposition in a neutral location and for either manual or automatic actuation of the control valve through either of the spaced apart spring elements by manual or automatic means.

Another and still further important object of this invention is to equip the air feed for drill presses of this invention with a means for optionally restricting flow from the exhaust ports of the control valve to thereby obtain temporary slowdown in the travel of the drill press spindle to simulate hand operation of the drill press.

Still another important object of this invention is to supply a bracket member with adjustable cam means mounted thereon and arranged on the drill press spindle in the line of travel of a means to restrict the flow of exhaust from the control valve whereby the speed of the spindle may be accurately controlled during its full travel by means of proper cam adjustment.

Other and further important objects and advantages will become apparent from the disclosures in the following specification and accompanying drawings.

In the drawings:

Figure 2 is an enlarged side elevational view partially in section of the air feed device as shown in Figure 1.

Figure 3 is a sectional view taken on the line 3—3 of Figure 2.

Figure 4 is a still further enlarged side elevational view of a portion of the air feed device of this invention and showing parts thereof in section.

Figure 5 is a sectional view taken on the line 5—5 of Figure 4.

Figure 6 is an elevational view of the air lines as employed in the air feed device of this invention.

Figure 7:
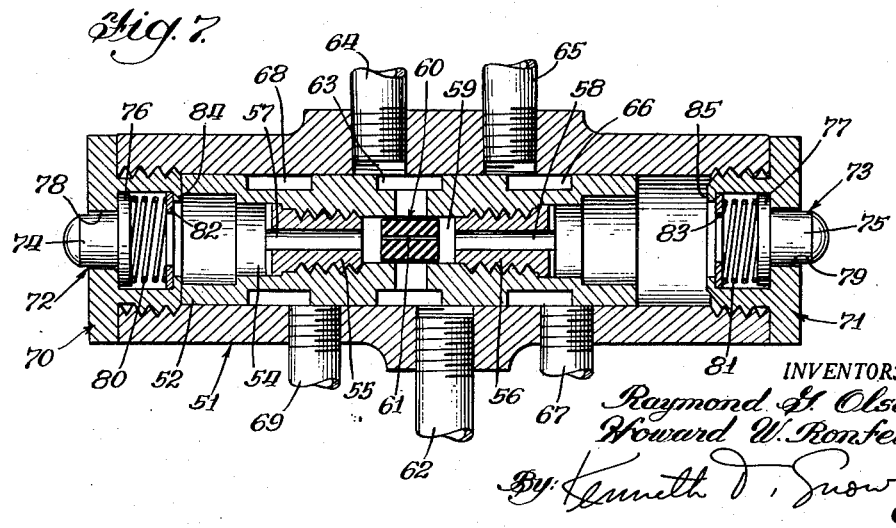

Figure 7 is a sectional view of the control valve employed in the device of this invention and as shown in the presently pending R. G. Olson application for patent now Patent No. 2,729,242.

Figure 8 is a transverse sectional view taken on line 8—8 of Figure 4 through the exhaust valves used on the control valve.

Figure 9 is an enlarged view of one end of the operating members for the control valve.

Figure 10 shows a perspective view of the spring member as used in the device of Figures 9 and 10 to normally urge the operating members into disengagement.

Figure 11 is a top plan view of the control valve and operating members as shown in Figure 9.

As shown in the drawings:

The reference numeral 10 indicates generally a frame supporting structure of a drill press or the like. It should be understood that although a drill press has been used to depict the air feed device of this invention other machine tools may have the device applied thereto. The frame supporting structure 10 of the drill press includes a generally vertically disposed post member 11, a pulley and belt housing 12 extending across the top of the supporting post 11, mounting tubes 13 and a motor bracket or base member 14 which is adjustably positioned in the supporting tube 13. A motor 15 is mounted on the base 14 and has a vertically extending driven shaft 16 extending upwardly into the belt and pulley housing 12.

The forward end of the drill press is equipped with a generally stationary housing 17 which forms a part of the frame supporting structure. A vertically reciprocable spindle 18 is movable from a position within the housing 17 to a position down and extended from the housing 17 during the drilling operation. The lower end of the spindle 18 is equipped with a rotatable tool chuck or the like 19 to hold a drill and thus during reciprocation of the spindle 18 the tool which may be applied to the chuck 19 is used to perform a drilling operation. The motor 15 is of the electric type and is provided with operating switches as shown on the front of the housing 17 at 20 and 21 indicating an "on" button and an "off" button respectively. The housing 17 carries the usual rack and pinion (not shown) to effect reciprocation of the spindle 18. The interior construction of the drill press has not been shown inasmuch as it is merely ordinary construction and forms no part of the present invention. However, the shaft 22 extending laterally from the housing 17 is commonly known as the "pinion shaft" and by this expression it means that it carries or has mounted thereon a pinion at the location of the interior of the housing 17 for engagement with a vertically disposed rack, the cooperation of which causes vertical movement of the spindle 18. With a drill press normally equipped a hand lever would be provided on the pinion shaft 22 to effect a manual vertical movement of the spindle 18. It is this pinion shaft 22 which applicants employ as the mounting means for the power operator of this invention. The hand lever (not shown) has been removed from the pinion shaft 22 and the air feed attachment generally indicated by the numeral 23 is journally mounted on the pinion shaft 22 to effect driving thereof.

Figure 1:
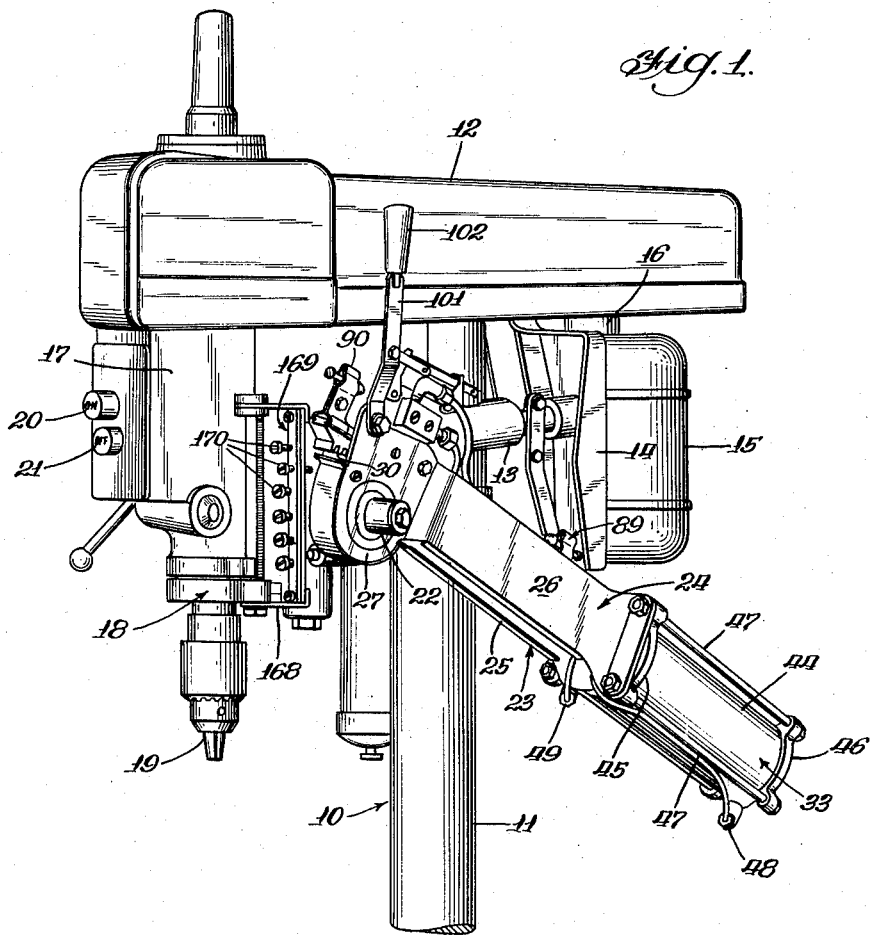
Figure 1 is a perspective view of the air feed device of this invention attached to and operating with a drill press.

The air feed attachment is equipped with a frame structure 24 which is auxiliary to the drill press frame supporting structure 10. The frame as best shown in Figures 1 and 3 is provided with inwardly facing channel members 25 and 26. The upper forward end of the frame structure 24 is equipped with an enclosure or housing 27 which as best shown in Figure 2 has a pinion gear 28 keyed as shown at 29 to the pinion shaft 22. The pinion gear 28 is carried within the enclosure housing 27 of the auxiliary frame structure 24 of the air feed of this device. A gear rack 30 is carried within the frame 24 of the air feed and is in meshing engagement with the gear pinion 28. Reciprocating movement of the gear rack 30 within the frame 24 causes rotation of the pinion gear 28 and thus also rotation of the pinion shaft 22 thereupon causing reciprocation and vertical movement of the drill press spindle 18. The rearward end of the gear rack 30 threadedly receives the forward end of a piston rod 31 as shown at 32. The piston rod is journally carried in the forward end of an enlarged air or fluid cylinder 33 as shown at 34. The piston rod 31 is provided with a piston at its rearward and innermost end within the fluid cylinder 33 as shown at 35. The piston 35 is fabricated from two opposing leather cup members 36 and 37 disposed back-to-back to one another and having an intermediately disposed metal washer or the like 38. Similarly a disc shaped washer member is provided on either side of the cup leather members as shown at 39 and 40. Lock nuts are provided on the piston rod at 41 and 42 in threaded engagement with the threaded end portion 43 of the piston rod. The lock nuts 41 and 42 are on each side of the fabricated assembly and the drawing up tightly on the lock nuts causes the assembly to form a rigid piston 35 with the piston rod 31.

The fluid cylinder as shown at 33 is of the two directional type and is provided with an enlarged cylindrical housing 44 with front and rear cap members 45 and 46 which are held to the cylindrical housing 44 by means of a plurality of elongated bolt members 47 at each of four evenly spaced corners around the housing 44. The fluid cylinder and in this case an air cylinder is equipped for two way operation and thus is adapted to have a conduit 48 for admitting of fluid or air under pressure to the rearmost end of the cylinder 33 and or the conduit 49 which will admit fluid or air under pressure to the forward end of the cylinder 33. Thus when fluid is admitted to the conduit 48 the piston 35 will be caused to move forwardly within the cylindrical housing 44. Such a movement of the piston forwardly within the cylinder 33 causes the rack to rotate the pinion gear 28 in a counterclockwise direction as viewed in Figure 2 whereupon the drill press spindle 18 with its tool holding chuck 19 moves vertically downwardly. Similarly when air or any fluid under pressure is admitted to the conduit 49 the piston 35 is caused to move rearwardly in the cylinder 33 with fluid or air under pressure exhausting from the conduit 48 and thereupon the gear rack 30 moves rearwardly along with the piston 35 to effect a clockwise movement of the pinion gear 28 as viewed in Figure 2 and thus a raising of the drill press spindle 18. The gear rack 30 is maintained in meshing relationship with the pinion 28 by reason of the guide roller 50 journally mounted in the auxiliary frame 24 between the spaced channel members 25 and 26.

The control valve used in this invention and as shown in copending application now Patent No. 2,729,242 is shown in transverse sectional view in Figure 7. The control valve includes a housing 51 within which is slidably mounted a spool 52. The spool valve 52 is adapted to slide from one end of housing 51 to the other end. The spool valve 52 has a central bore 54 having bushings 55 and 56 therein with restricted apertures or bores 57 and 58 respectively. The bushings 55 and 56 define a central chamber 59. A slide valve or poppet member 60 is located within the enlarged chamber 59 and is adapted to seat against the inner end of either of the bushings 55 or 56 and thereupon create an unbalance in the fluid within the control valve. A minute bore is provided in the poppet 60 to thereupon prevent complete seal off of either end of the valve. Thus the fluid in the valve will eventually equalize to provide for a centering of the poppet within the chamber 59. Fluid under pressure is admitted to the control valve through the conduit 62 whereupon it passes around the annular groove 63 in the outer surface of the spool 52 and thence is delivered outwardly through either of the conduits 64 or 65. In the position of the spool 52 as shown in Figure 7 the fluid is delivered under pressure through the conduit 64. In the event the spool 52 were moved to the other end of the housing 51 the fluid under pressure would be discharged through the conduit 65. The conduits 64 and 65 are joined respectively to the fluid cylinder ports 48 and 49. When fluid under pressure is admitted or delivered through the conduit 64 it must be exhausted backwardly through the conduit 65 and as shown in Figure 7 the exhausting fluid passes around an annular groove 66 in the spool valve 52 which has communication with an exhaust port 67. Conversely when the spool valve 52 has moved to the other end of the housing 51 and fluid under pressure is sent out through the conduit 65 the exhaust fluid from the cylinder 33 comes back through the conduit 64 and by means of an annular groove 68 in the surface of the spool 52 there is communication with another exhaust port 69. The unbalancing of the fluid in the control valve causes movement of the spool valve 52 from one end of the housing to the other. As shown in Figure 7 end plugs 70 and 71 are threadedly engaged with the ends of the housing 51 to thereupon close the ends of the housing and provide for the enclosed control valve of this invention. Bleeder means 72 and 73 are positioned in each end plug 70 and 71 respectively in order to mechanically exhaust fluid from each end of the valve housing and thereupon cause an unbalancing of the fluid in the valve and movement of the spool 52 in the direction of the exhausting fluid through the end plugs. The bleeder means as shown in Figure 7 constitute projecting buttons 74 and 75 having enlarged flanges 76 and 77 respectively. The buttons 74 and 75 with their integral flanges 76 and 77 are urged against the inner surfaces of the end plugs 70 and 71 thereupon effecting a sealing of the apertures 78 and 79 in the end plugs which provide the passage means for the extending buttons 74 and 75. These buttons and integral flanges are urged into seat closing positions by fluid under pressure within the housing 51 of this control valve and also by means of auxiliary springs 80 and 81 which are confined in the end plug bushings by means of washers 82 and 83 which are in turn held by an inwardly extending annular flange 84 and 85 on the inner end of the end plugs 70 and 71. Obviously the bleeder means may be any valve members capable of sealing the apertures 78 and 79 and also capable of opening the apertures 78 and 79 to the fluid within the housing 51 to thereby exhaust the fluid under pressure from that particular end of the control valve. For greater detail of explanation of the operation of this control valve attention is directed to the copending application now Patent No. 2,729,242.

The control valve is bolted to the auxiliary frame 24 of the air feed device of this invention by means of bolts 86 and 87 passing through the spaced side walls of the housing 27 at the forward end of the cooperative frame walls 25 and 26. The positioning of the control valve on the auxiliary frame 24 and more particularly with respect to the pinion shaft 22 is extremely important and contributes materially to the successful operation of the device of this invention. A center line drawn through the pinion shaft 22, through the pinion 28, and at a right angle to the tangent between the pinion 28 and the gear rack 30 is to be considered the mounting center line for the control valve. This construction is shown in both of Figures 2 and 4. Obviously then with the control valve directly on the centerline of the pinion gear the gear rack 30 may have equal movement in both directions by reason of the bleeder means disposed at each end of the control valve and symmetrical about the center of the control valve. Adjustable stop members 89 and 90 are disposed at the inner end and the outer end of the gear rack 30 respectively. The construction and adjustable features of the stop members 89 and 90 will be subsequently described in detail, but for the present it is sufficient to note that they are geographically positioned on either side or end of the control valve and they they may act to depress either of the bleeder means 72 or 73 and thereupon effect operation of the control valve and also operation of the drill press spindle or in the event the device is used on some other machine tool then movement of the movable part of that tool.

The adjustable stop 89 is shown in detail in Figures 2 and 3 wherein the gear rack 30 is provided with longitudinally extending grooves 91 and 92 on opposite sides thereof for engagement by inwardly turned flanges 93 and 94 at the bottom of the adjustable stop 89. These flanges 93 and 94 engage the grooved tracks 91 and 92 in the gear rack 30 and thus may slide lengthwise of the gear rack and be held in any desired position therealong by means of a bolt means 95 drawn up tightly between the legs 96 and 97 of the stop 89 whereby further movement of the stop 89 is halted until the screw is loosened and the stop again adjusted as desired. A rubber bumper 98 is clamped within the upper portion of the opposed legs 96 and 97 of the stop 89 and provides cushioned means for engaging bleeder means of the control valve. The rubber bumper 98 is conical in shape as shown in Figure 2 and is provided with a screw 99 at the rearmost side of the stop 89 to hold the bumper in that position on the stop. It should be understood that the stop 90 at the other end of the gear rack is similarly constructed having inwardly turned flanges which ride in the same grooves 91 and 92 as for the stop 89 and hence it will not be described in detail. It is sufficient to note that the stop 89 with its conical shaped rubber bumper 98 will engage and actuate the bleeder means 73 and that the stop 90 will effect actuation of the bleeder means 72 on the upper side of the control valve.

As best shown in Figures 4, 9, and 11 the control valve is supplied with a harness 100 which includes a generally upwardly extending lever 101 having a hand engaging portion 102 at the upper end thereof. The lower end of the lever 101 is hingedly mounted to the auxiliary frame structure 24 at 103 as shown in Figure 2. A beam link 104 is hingedly mounted at 105 to the hand lever 101 intermediate its ends. The beam link 104 is generally disposed parallel to and above the control valve as used in this invention. The harness further includes a pair of bell crank members 106 and 107 which are hingedly mounted respectively at 108 and 109 on the outer wall of the control valve. The hinging attachment of these bell-crank members 106 and 107 on the control valve are at a position adjacent the ends of the control valve near the bleeder means at 72 and 73 respectively. As best shown in Figure 11 the bell crank member 106 is substantially U-shaped having side walls or arms 110 and 111 providing for the hinge attachment at 108 to the valve body 51. The back or base portion of the member 106 is a substantially upright wall 112 joining the side walls 110 and 111. The general construction of the back wall 112 is clearly shown in Figure 9 of the drawings. Similarly the shape of the beam link 104 is shown in Figure 11 wherein this central portion thereof is offset throughout an extended portion 113 to clear the input port 62 to the valve housing 51. It should be understood that the drawing of the control valve in Figure 7 has been shown with all the input, output and exhaust ports in a single plane whereas in fact in order to make room for all of these entrances and exits to the control valve they must of necessity be spaced around the peripheral surface of the housing 51. The ends 114 and 115 of the beam link are generally in alignment with each other and offset from the portion 113 thereof. The end 114 passes through an aperture 116 in the end wall 112 of the bell crank lever 106. A fixed cross pin 117 is mounted in and with the beam link 104 in the portion 114. Thus the beam link 104 has rigidly movable therewith the cross rod 117 adjacent the bell crank member 106. The positioning of the cross member 117 with respect to the bell crank member 106 is at a point substantially above the hinge 108 on the body of the control valve. Thus when the beam link 104 is shifted axially and the rod 117 is pushed outwardly against the end wall 112 of the bell crank 106 the bell crank will hinge about its pivot 108 and the lower end thereof as shown at 118 in Figures 4 and 9 will be caused to move inwardly against the end wall of the valve housing 51. The beam link 104 further includes a branch member 119 which is hingedly mounted at 120 on the offset portion 113 thereof. It is to this branch portion that the hand lever 101 is hingedly attached at 105. Thus arcuate movement of the hand lever 101 about its hinge mounting 103 on the frame structure 24 the beam link 104 will be moved back and forth across the top of the control valve.

It should be noted from the device as shown in both of Figures 2 and 4 that the bell crank levers 106 and 107 are normally urged outwardly so that neither lower end is in engagement with either of the bleeder means at the end of the control valve. This is accomplished by reason of spring means such as shown in Figure 10 at 121. The spring 121 is equipped with axially aligned spaced apart coils 122 and 123. These coils of spring are formed from a single piece of spring wire bent to include side arms 124 and 125 adjacent each of the coils 122 and 123 respectively. A bottom bail like cross member is shown at 126 which joins the side portions of the spring member together but spaced slightly from the axis through the coils 122 and 123. The spring 121 is mounted over the shaft 108 with the axially aligned spaced apart coil spring portions 122 and 123 superimposed thereover. The offset base or bail member 126 projects from the shaft 108 toward the lower extension 118 of the bell crank member and abuts that end on the inner surface thereof. The upper arms 124 and 125 project upwardly adjacent the sides 110 and 111 of the bell crank 106 and terminates within inwardly bent portions 127 and 128 at the upper edge of the bell crank 106. It will be seen from Figure 10 that the spring member 121 includes slightly angularly disposed ends 129 and 130 at the outer ends of the arms 124 and 125 so that these bent end portions snugly engage the inwardly curved portions of the bell crank 106. Thus when either of the bell cranks 106 or 107 is urged inwardly to effect actuation of the bleeder means of the control valve this movement must be against the action of the spring 121. The spring for both ends of the bell crank members are identical and the one shown in association with the bell crank 107 will not be further described in detail but the reference numerals applied to the one will be applied to the other.

It has been stated that movement of the bell cranks 106 and 107 toward the ends of the control valve is for the purpose of actuating the bleeder means in the ends of the control valve. However, the lower extension 118 of the bell crank members do not project sufficiently low to engage either of the button means 74 or 75 in the ends of the control valve. It has been deemed advisable not to have the rigid arm member 118 of the bell crank members 106 and 107 directly engage the bleeder means in the ends of the control valve but rather to employ an intermediate member with a certain amount of resilient characteristic and further one which will not tend to cock the bleeder means buttons 74 or 75. A leaf spring member 131 has an aperture 132 through which the beam link 104 may pass. This aperture 132 corresponds to the aperture 116 in the back face of the bell crank member. The leaf spring 131 is therefore hung from the end portion 114 of the beam link 104. The leaf spring 131 is therefore not directly attached to the bell crank members 106 and 107 yet the springs move with the bell crank members when they are moved by reason of their close association with the bell crank members and further the springs are mounted between the cross rods 117 on the beam link 104 and the end walls 112 of the bell crank members. Therefore the leaf springs are relatively confined within this assembly yet the springs have adequate room for a certain amount of relative movement. When the hand lever 101 is swung about its hinge 103 on the frame structure 24, the leaf spring 131 at one end will be pushed inwardly by the downwardly depending arm 118 of the bell crank lever and thereupon pushed against the valve buttons 74 or 75 depending upon the end thereof to cause actuation of the control valve. The leaf spring 131 is relatively long insuring that no matter how the bell crank levers 106 or 107 are swung the spring will most assuredly contact the bleeder valve buttons 74 or 75 and thereupon crack that end of the valve and permit actuation thereof in the manner previously explained. The lower end of the leaf springs 131 are dimpled as shown at 133 and 134 in Figure 9 to prevent the leaf spring from assuming a position flush against the end wall of the valve housing and thus even though the bleeder valve buttons are depressed the spring would cover the openings 78 and 79 in the control valve and thus prevent discharge of fluid from these ends which is so essential to the operation of the control valve. Thus the dimples 133 and 134 prevent this situation and permit escape of fluid past the leaf spring 131 at all times.

Previously the adjustable stops for the gear rack 30 have been described and the rubber bumpers 98 for the stops have been shown to engage the ends of the control valve to thereupon cause automatic actuation of the control valve merely upon movement of the gear rack. Now there has been described the harness which is mounted over the control valve and the actuation thereof by the hand lever 101 and its handle 102. It will be seen that the leaf springs 131 are disposed intermediate the rubber bumpers 98 of the adjustable stops and the bleeder buttons 74 or 75. Thus the leaf springs 131 again act as an intermediate between the operating member and the bleeder button so that when the adjustable stop with its rubber bumper 98 is to actuate the control valve it actually presses inwardly on the leaf spring 131 to cause that element to be deflected inwardly and depress the button 75 as shown in Figure 4. Inasmuch as the leaf spring 131 is not affixed to the bell crank member 107 it thereupon does not cause angular movement of the bell crank member but rather the leaf spring 131 is permitted separate movement to cause actuation of the control valve by this automatic means. Therefore it is now seen that whether the control valve is actuated by the automatic means or rather the adjustable stop on the gear rack 30 or by movement of the harness through the hand lever 101—102 the leaf springs 131 are intermediate the bleeder means and thereupon make for uniform depression of the bleeder means and like operation of the control valve at all times.

As shown in Figure 4 the control valve is equipped with valves 136 and 136 in the exhaust ports 67 and 69. These valves are shown in detail in Figures 8 and inasmuch as they are identical one to the other only one of them has been shown. The valve body 135 includes a threaded bushing portion 137 which threadedly engages the internal threads 138 in the control valve housing 51. The valve 135 is in the nature of a plug within the exhaust port and has an enlarged head portion 139 which is provided with a threaded aperture 140 to receive a needle valve 141 having a knurled hand nut 142 at the outer end. The inner end of the needle valve 141 is equipped with a long tapering needle end 143 which is adapted to cooperate with a valve seat 144 formed within the valve body head 139 at the lower end of the aperture or chamber 140. A restricted aperture or passage 145 is adapted to pass through the threaded bushing portion of the valve and engage or meet the chamber 140. The valve seat 144 is located at the juncture between the restricted passage 145 and the enlarged chamber 140. A transverse passage 146 joins the enlarged chamber 140 and the outer periphery of the enlarged head 139 of the valve which is exposed to the atmosphere. Thus when exhaust is passed through the port 67 it will first enter the restricted passage 145 and if the needle valve with its end 143 permits passage by the valve seat 144 the fluid being exhausted will then be discharged from the transverse passage 146. Thus by varying the position of the needle 143 with respect to the valve seat 144 by operation of the knurled hand nut 142 the rate of discharge of the exhaust from the exhaust ports 67 and 69 may be accurately controlled. It should be understood that the speed of actuation of the control valve to effect a movement of the gear rack 30 through operation of the cylinder and piston is materially retarded in the event the exhaust fluid is restricted in its movement. Obviously if the exhaust ports were completely closed off there would be or could be no movement permitted by the control valve and similarly if the exhaust ports were partially closed off there will be a corresponding retarding of the speed of movement of the control valve and thus also the gear rack 30 which is directly actuated by the cylinder and piston. In the device as shown in Figure 4 the exhaust port 69 is supplied with a side cut-in as shown at 147. This cut-in constitutes a T or the like within the port 69 so that the exhaust port actually has two branches, one which passes out into the valve 136 and the other to the port or pipe 147 to which is attached a flexible conduit 148 terminating in a special exhaust fluid valve 149. Thus in the exhaust port 69 there are two means for controlling the exhausting of fluid therefrom, that is, the valve 136 and the valve 149. Obviously the needle valve 136 may be closed off entirely and thus the port 69 would be controlled solely by operation of the valve 149. Or, it is also obvious that the two valves may work simultaneously with the needle valve 136 minimizing the exhausting of fluid from that end of the control valve and the special exhaust valve 149 actuating as will be subsequently described.

The special exhaust valve is carried on a bracket 150 by means of a bolt or the like 151 holding the bracket to the auxiliary frame structure 24. The bracket 150 is adapted to carry a valve housing 152 which is cylindrical in shape and relatively elongated. The housing 152 includes an inlet portion 153 having a passage 154 therethrough. The inner end of the passage 154 terminates in a valve seat 155 against which the ball valve operates as shown at 156. The passage 154 communicates with the flexible conduit or tubing 148 and thus receives the exhaust fluid from the port 69. When the ball 156 is firmly seated on the valve seat 155 there is no exhausting of fluid from the port 69 through the flexible tubing 148. A control plunger is shown at 157 at the outer end of the exhaust valve 149 and is adapted to be extended from the housing 152 by reason of a light coil spring 158. It is depression of this extended button or plunger 157 by screw or cam means which causes restriction to the exhausting of certain of the exhaust fluids. The coil spring 158 normally urges the plunger 157 outwardly as shown in Figure 4. An inner actuating member is shown at 159 and is adapted to have its inner end engage the ball 156 to thereupon urge the ball toward its seating position and thus the closing position. A spring 160 is mounted intermediate the inner control member 159 and the plunger 157. Thus as the spring 158 is compressed by an upward movement of the plunger 157 the stronger or heavier spring 160 will also be compressed causing the ball valve 156 to be seated with greater force and thus restrict the passage of exhaust fluids past the ball to the transverse opening 161. This heavy spring also takes care of any overtravel which may be applied to the plunger 157 and thereupon prevent any damage to the ball valve 156. The plunger 157 is equipped with spaced shoulders 162 and 163 within which a locking ring is adapted to project from its position within the outer housing 152 as shown at 164 in Figure 5. Figure 5 is a sectional view taken through the valve between the spaced shoulders 162 and 163 whereupon the reduced diameter plunger 165 provides a chamber within which the inwardly projecting end 164 may pass. An annular groove 166 in the outer circumference of the housing 152 receives the snap ring 167 the end of which has the inward extension 164 passing into the chamber about the portion 165 of the plunger 157. Thus the plunger 157 is restricted in its movements into or out of the housing 152 by reason of the snap ring 167 and its inward projection 164.

The drill press spindle 18 has a bracket 168 which is capable of moving with the vertically moving spindle and thereupon may be used to automatically control the speed of movement of the drill press spindle by actuation of the special exhaust valve 149. The bracket 168 includes a vertical bar or rack 169 having a plurality of adjustable screws 170 therein. The screws are turned inwardly more or less depending upon the desires of the operator. When the screw is turned inwardly a greater distance the inner end shown in Figure 4 at 171 will engage the outer end of the valve plunger 157 to thereupon push inwardly on the plunger and thus restrict passage of exhaust fluids therethrough. The inner ends of the multiple number of screws 170 may be arranged in any pattern to effect any desired cam shape to thus regulate the speed of the spindle movement over a substantial portion of the travel thereof. The vertical rack member 169 of the bracket 168 comprises a three piece laminated element of an outer metal strip 172 and an inner metal strip 173 with a sandwiched or intermediate fibre board strip 174. The screws 170 are applied to the gear rack by engaging threaded holes in the rack 169 and by reason of the sandwiched fibre board 174 there is an automatic locking of the screws in their adjusted positions. As previously stated the screws and more particularly their inner shank extensions 171 engage the plunger member 157 of the special exhaust valve 149 to thereupon slow down the actuation of the control valve and thus also slow down the actuation of the drill press spindle or if some other machine tool has the device applied thereto then the movable portion of that tool is slowed down. Inasmuch as the bracket 168 moves with the movable spindle of the drill press it should be understood that the speed of the drill press spindle may be accurately controlled at any portion of the travel thereof merely by adjusting the screws to the proper extension. The screws 170 act as a cam for actuation of the exhaust valve and inasmuch as the screws are readily adjustable the resultant cam is an adjustable cam. Obviously any shape cam may be employed in lieu of the screw type cam as shown.

As best shown in Figure 6 the apparatus includes a source of air under pressure (not shown) having a conduit 175 leading therefrom to an air filter 176. The air filter 176 is carried on a bracket 177 which in turn is attached to the drill press frame structure 10 on the far side of the machine at 177a. The filtered air then passes through a conduit 178 to a pressure regulator 179 having a pressure gauge 180 in association therewith. The now filtered air having been placed under a predetermined pressure passes through a conduit 181 to an oiler 182 which applies an atomized oil to the air to provide for constant lubrication of the control valve 51. The control valve of course has the intake port 62 which receives the filtered, pressure regulated, and oiled air through a conduit 183. Thereafter the air under pressure is used in the control valve when it is actuated by depression of either of the bleeder valve buttons 74 or 75.

The main portion of the air feed attachment of this invention is supported by a bracket 184 which is bolted as at 185 to the auxiliary frame structure 24. The bracket 184 is of the hanger type and extends upwardly to the motor mounting bracket 13 which has a shaft 186 in association therewith whereby the motor 15 with its base or mounting plate 14 may be moved toward or away from the vertical post 11 of the drill press. It is to this shaft 186 that the hanger bracket 184 is attached by means of a clamp 187 in cooperation with bolt members 188 and 189. All of this is clearly shown in Figure 3 and still further shown in Figures 1 and 2.

In the operation of the device of this invention it should be understood that the power feed mechanism may be applied to any machine tool as previously discussed and the showing with the drill press is only one application of the device. First the device may be operated entirely manually, by-passing the power feed of this invention merely by applying a hand lever to the extended shaft 22 upon which the power feed of this invention is mounted. Secondly the device may be power operated by manually actuating the hand lever 101—102 which through the means of the harness 100 causes depression of either of the bleeder valves at the end of the control valve to effect movement of the control valve spool to either one end or the other and thereupon admit fluid under pressure to either one end or the other of the fluid cylinder 33 whereupon the rack 30 is moved in either of two directions within the auxiliary frame structure 23. The harness mechanism has been described in detail and it is not now believed necessary to repeat here. It should be understood that the hand lever 101—102 may be actuated at any time to effect operation of the bleeder means at the end of the control valve to thus reverse the direction of movement of the movable portion of the machine tool or as in the drill press shown herein the drill spindle. With the control valve 51 disposed symmetrically over the center line of the pinion gear 28 and the gear rack 30 intermediate the pinion gear and the control valve, the gear rack 30 may thus have its full range of movement and still actuate the ends of the control valve by stop members provided on the gear rack as previously described. These stop members 89 and 90 are adjustable along the length of gear rack to thereupon cause an automatic reversal of the cycle and thus a reversal of the drill press spindle by reason of the stop members 89 and 90 striking the bleeder means through the intermediately disposed leaf springs 131. By utilizing the exhaust fluid from the control valve the speed of the drill press spindle may be accurately controlled in its downward movement by reason of the special valve member 149 which is actuated by the cam means or screws 170 and their ends 171 on the bracket member 168. As an example of the utilization of the adjustable cam means as symbolized by the multiple screws in the bracket 168 when the drill press is employed to drill a hole in a piece of metal or the like it is desired to momentarily slow down the drill press spindle just prior to the drill entering the surface of the metal in order to avoid breaking of the drill whereafter it is desired that the drill be speeded up to quickly pass through the piece of metal and again just prior to the exit of the drill from the lower surface of the piece of metal it is desired to slow down the drill to avoid a tearing of the metal by cutting an unduly large chip. Thus the controlling of the speed of the drill press by utilizing the exhaust fluid does have real merit and use in this invention. As another example of the use of the drill slow down it should be understood that when drilling through tubing or pipes or the like it is desirable to temporarily slow down the drill just prior to entering the top surface of the tubing, to speed up during the drilling of the wall of the tubing, to slow down as it exits from the top wall, and thereafter a repeating of this same slow down, speed up, and slow down for the lower wall of the tubing. Obviously the multiple or plural screws spaced apart vertically in the bracket 168 adequately perform this function of slow down at any desired point during the travel of the drill press. Immediately upon release of the plunger 157 of the special exhaust valve 149 the exhaust fluid is permitted to readily escape and the control valve accordingly speeded up and simultaneously the drill press spindle is speeded up.

Numerous details of construction may be varied throughout a wide range without departing from the principles disclosed herein and I therefore do not propose limiting the patent granted hereon otherwise than as necessitated by the appended claims.

What is claimed is:

1. A power operator attachment for machine tools of the type having a frame supporting structure, a reciprocable portion and a rotatable shaft for actuating the reciprocable portion, and said power operator comprising: a frame adapted to be affixed to the frame supporting structure of the machine tool, a pinion gear adapted to fit on the rotatable shaft of the machine tool and impart rotation thereto, a two-directional fluid cylinder mounted on said frame, a piston reciprocable within said cylinder, a piston rod attached to said piston, a gear rack journaled on said frame for sliding movement thereon in engagement with said pinion gear, said gear rack attached to and moving with said piston rod, means attaching a source of fluid under pressure to said cylinder, a control valve mounted on said frame, means operating said control valve to effect a movement of said machine tool reciprocable portion, said control valve having oppositely extending bleeder means for actuating said control valve and means operating said bleeder means including a harness mounted on said frame, said harness including a hand lever hinged on said frame, a beam link disposed parallel to and above said control valve, said beam link pivotally attached at one end to an intermediate point on said hand lever, bell-crank members hinged on said control valve adjacent said bleeder means and having their one arms pivotally mounted on said beam link, and the other arms of said bell-crank members arranged and constructed to engage the bleeder means upon swinging movement of said hand lever.

2. A power operator attachment for machine tools of the type having a frame supporting structure, a reciprocable portion and a rotatable shaft for actuating the reciprocable portion, and said power operator comprising: a frame adapted to be affixed to the frame supporting structure of the machine tool, a pinion gear adapted to fit on the rotatable shaft of the machine tool and impart rotation thereto, a two directional fluid cylinder mounted on said frame, a piston reciprocable within said cylinder, a piston rod attached to said piston, a gear rack journaled on said frame for sliding movement thereon in engagement with said pinion gear, said gear rack attached to and moving with said piston rod, means attaching a source of fluid under pressure to said cylinder, a control valve mounted on said frame, means operating said control valve to effect a movement of said machine tool reciprocable portion, said control valve having bleeder means to cause movement of the piston in either direction, said means operating the control valve including adjustable stops on said gear rack to actuate said bleeder means to automatically reverse the direction of movement of the reciprocable portion of the machine tool at any desired point within the limits of the gear rack travel, said control valve bleeder means including: a harness mounted on said frame, said harness including a hand lever hinged on said frame, a beam link disposed substantially parallel to and above said control valve, said beam link pivotally attached at one end to an intermediate point on said hand lever, bell-crank members hinged on said control valve adjacent said bleeder means and having their one arms pivotally mounted on said beam link, and the other arms of said bell-crank members arranged and constructed to engage the bleeder means upon swinging movement of said hand lever.

3. A device as set forth in claim 2 in which the arms of the bell-crank members which engage the bleeder means have leaf springs adjacent thereto, said leaf springs hung on said beam link whereby the bleeder means of the control valve are engaged by said leaf springs.

4. A device as set forth in claim 3 in which the leaf springs are sufficiently long to extend down between the adjustable stops on the gear rack and the bleeder means whereby whether the control valve is actuated by either the hand lever or movement of the gear rack the leaf springs directly engage the bleeder means.

5. A device as set forth in claim 4 in which the leaf springs are provided with an irregular surface at their lower ends to prevent seal-off of the bleeder means.

6. An operating device for a machine tool of the type having a frame structure, a portion reciprocable on said frame structure, a shaft adapted to be rotated to effect reciprocation of said portion, said operating device including: a pinion gear mounted on the shaft of the machine tool, an auxiliary frame affixed to said machine tool frame structure, a gear rack journaled in said auxiliary frame for sliding movement therein, said gear rack in engagement with said pinion gear whereby movement of said gear rack causes movement of the machine tool reciprocable portion, a fluid operated two-way cylinder mounted on said auxiliary frame, a piston in said cylinder, means joining said piston and said gear rack whereby they move concurrently, a control valve of the type having operating means in opposite ends thereof, said control valve disposed centrally over said pinion gear and gear rack on a line perpendicular through the center of the pinion gear and through the tangent of the pinion gear with the gear rack, and actuating means for said control valve, said actuating means including stops on each end of said gear rack whereby substantially the full range of movement of the machine tool reciprocable portion is utilized.

7. An operating device for a machine tool of the type having a frame structure, a portion reciprocable on said frame structure, a shaft adapted to be rotated to effect reciprocation of said portion, said operating device including: a pinion gear mounted on the shaft of the machine tool, an auxiliary frame affixed to said machine tool frame structure, a gear rack journaled in said auxiliary frame for sliding movement therein, said gear rack in engagement with said pinion gear whereby movement of said gear rack causes movement of the machine tool reciprocable portion, a fluid operated two-way cylinder mounted on said auxiliary frame, a piston in said cylinder, means joining said piston and said gear rack whereby they move concurrently, a control valve of the type having operating means in opposite ends thereof, said control valve disposed centrally over said pinion gear and gear rack on a line perpendicular through the center of the pinion gear and through the tangent of the pinion gear with the gear rack, and actuating means for said control valve, said actuating means including adjustable stop members on said gear rack at each end thereof whereby the stop members act to directly operate the control valve at opposite ends thereof and there is substantially an even stroke in both directions.

8. A device as set forth in claim 7 including means interposed between said stop members and said control valve for manually operating said control valve in either direction at any time.

9. A device as set forth in claim 8 in which the means interposed between said stop members and said control valve includes a hand lever hinged at one end on said auxiliary frame, said other end of said hand lever having a hand gripping portion, bell-crank operating levers hingedly mounted on said control valve at opposite ends thereof, said control valve operating means comprising bleeder means in the ends of said control valve, one arm of each of said bell-crank operating levers projecting generally upwardly and the other arm of each of said bell-crank operating levers projecting downwardly adjacent said bleeder means, and a beam link having one end hingedly attached to said hand lever intermediate the ends thereof and extending in a substantially parallel position over said control valve, and the upwardly projecting arms of the bell-crank operating levers hingedly attached to said beam link, and spring means normally urging each of said bell-crank operating levers downwardly projecting arms away from engagement with said bleeder means, whereby when the hand lever is swung about its hinge the beam link will swing one or the other of the bell-crank operating levers downwardly projecting arms into bleeder means engagement.

10. A device as set forth in claim 9 in which the downwardly projecting arms include leaf spring extensions for engagement of the bleeder means and said leaf spring extensions act as an intermediate member for the striking of the bleeder means by the adjustable stops on the gear rack.

11. A power operator attachment for machine tools of the type having a frame supporting structure, a reciprocable portion and a rotatable shaft for actuating the reciprocable portion, and said power operator comprising: a frame adapted to be affixed to the frame supporting structure of the machine tool, a pinion gear adapted to fit on the rotatable shaft of the machine tool and impart rotation thereto, a two-directional fluid cylinder mounted on said frame, a piston reciprocable within said cylinder, a piston rod atached to said piston, a gear rack journaled on said frame for sliding movement thereon in engagement with said pinion gear, said gear rack attached to and moving with said piston rod, means attaching a source of fluid under pressure to said cylinder, a control valve mounted on said frame, means operating said control valve to effect a movement of said machine tool reciprocable portion, said control valve having an exhaust port, valve means associated with said exhaust port for optionally restricting the exhaust port and thereby controlling the speed of movement of the reciprocable portion of the machine tool, said valve means having a spring extended operating plunger, said machine tool reciprocable portion including a bracket thereon, and plural adjustable cam means on said bracket positionable more or less in the path of movement of the spring extended operating plunger of the valve means whereby the speed of the reciprocable portion of the machine tool may be adjusted for any position or positions during its reciprocable travel.

References Cited in the file of this patent

UNITED STATES PATENTS

| | | |
|---|---|---|
| 1,816,829 | De Leeuw | Aug. 4, 1931 |
| 2,418,220 | Churchill | Apr. 1, 1947 |
| 2,568,450 | Hjarpe | Sept. 18, 1951 |
| 2,607,197 | Johnson | Aug. 19, 1952 |